Sept. 25, 1962   O. GOLFIERI   3,055,308
HYDRAULIC GEAR PUMPS AND MOTORS
Filed April 11, 1961

INVENTOR.
Oberdan Golfieri
BY
Richards & Geier
ATTORNEYS

3,055,308
HYDRAULIC GEAR PUMPS AND MOTORS
Oberdan Golfieri, Bologna, Italy, assignor to Sima-Societa Iesina Macchine Agrarie-Soc. p. Az., Iesi, Italy
Filed Apr. 11, 1961, Ser. No. 102,197
Claims priority, application Italy Feb. 22, 1961
1 Claim. (Cl. 103—126)

As is widely known, a gear pump consists of a pair of meshing gears contained in a pump casing, a minimum clearance being allowed between the latter and the tooth tips and sides, so that, when the drive shaft to which one of the gears is attached drives the latter into rotation together with the companion gear, the space left free by the teeth opposite the suction pipe is occupied by the liquid and the latter, moved by the tooth spaces and because of the very small casing clearance, is ejected from the delivery side.

While the principle of such a machine—which is also reversible, in the sense that it can serve as a motor by sending into it liquid under pressure—is extremely simple, its construction presents many difficulties, particularly when it is required to operate at high efficiency and high pressures, today as high as some hundred atmospheres.

In such pumps, the body or casing can be central, i.e. comprised between two side cover plates. With the cover plates and gears removed, the pump body will present a through cavity of figure 8 shape, similar to that of the profile of the meshing gears, seen along a line parallel to their shafts. The spacing of the gear centers will therefore be equal to their pitch circle diameter.

At the same time, provisions have to be made to ensure the lateral sealing, in the sense of preventing the fluid from flowing along the generatrices of the cavity in the pump body.

If the pump body is fitted with one cover plate only, the cavity which houses the gears and the lateral sealing means will penetrate only to a certain depth into the pump body, so that the flat bottom left constitutes a cover plate intergral with the pump body.

In either case, there must be fitted to the side of the gears means for hermetical sealing, following precisely, on the plane containing the gears, the shape of the cavity in the pump body. A widely used system is that of fitting in the pump body cavity, two thrust plates or cylindrical bushings cut through and coupled along the line joining the points of intersection of the cavities which house the gears in the pump body; another system ensures the lateral sealing by means of a single part reproducing the pump body profile, i.e. eyeglass-shaped.

In either case, however, perfect sealing fits can be achieved only by high-precision machining and special equipment, which is necessarily costly.

The object of the present invention, therefore, is to have hydraulic pumps and motors of the aforesaid type built to a design obviating the said difficulties and making it possible to achieve a perfect lateral sealing, while adopting economical and simple machining processes, which do not require the use of special machinery and tooling. The principle upon which the invention is based is to provide in each face of the pump body, through cylindrical cavities the axes of which are spaced by a distance equal to the pitch circle diameter of the gears, both of the latter with their shafts and the bushing-shaped lateral sealing elements, being housed in the said cavities.

The detailed disclosure of the invention will be more easily followed by referring to the enclosed drawing which represents, as a non-limiting example, one preferred embodiment hereof.

Figure 1:
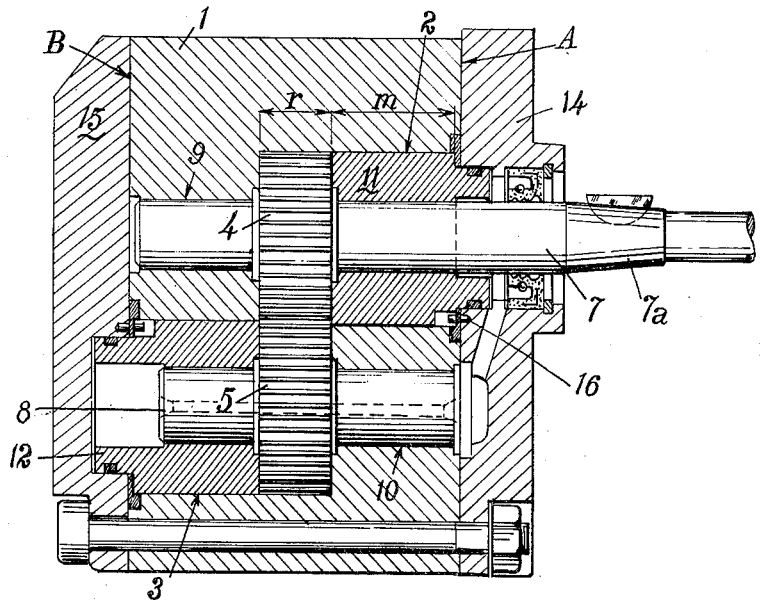
FIG. 1 is a general cross-sectional view of the pump.
Figure 2:
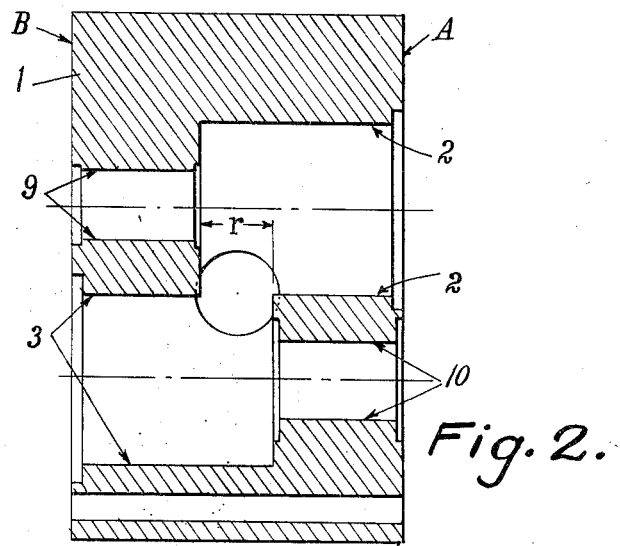
FIG. 2 is a longitudinal cross-sectional view of the pump body.

With reference to the figures, pump body 1 has two lateral faces, A and B. Face A contains the cylindrical cavity 2; face B contains an identical cavity 3, its axis being parallel to that of cavity 2, and its position being staggered with respect thereto by a distance equal to the pitch circle diameter of gears 4 and 5. The latter are mounted on shafts 7 and 8, shaft 7 being fitted with a taper 7a and a key for coupling with the drive motor.

In axial alignment with cylindrical cavity 2, the pump body has a hole 9 which receives shaft 7, an identical hole 10 being provided in the opposite wall of the pump body to receive shaft 8 of the companion gear. On either side of the pump body, therefore, the depth of the cavities 2 and 3 will be equal to "$r$" (length of teeth 4) plus "$m$" (length of the remaining part of the pump body), in which "$m$" is the length of bushings 11 and 12. The latter occupy cavities 2 and 3, fitting precisely against the inner cylindrical walls thereof. Moreover, bushings 11 and 12 are bored to receive respectively shafts 7 and 8, and their length "$m$" is such that they rest without appreciable friction against the annular faces of gears 4 and 5, the same being true of the surfaces of the pump body on the opposite side of the bushings, with respect to the gears.

Locking pins 16, placed between cover plates 14 and 15 and bushings 11 and 12, prevent the latter from rotating. The seals fitted to shaft 7, to the bushings and to the cover plates, are of conventional type.

It is easy to understand that bushings 11 and 12, being cylindrical, are in the best conditions to form a perfect seal against, respectively, the surfaces of cavities 2 and 3, as well as on shafts 7 and 8. Likewise, since the bushings can rest against the annular planes of the sets of teeth 4 and 5, and against the internal cover plate faces, the machining of the most delicate and important pump parts does not involve any special difficulty and does not require special machinery and tooling.

It is evident from the foregoing that the design and arrangement, described above, of the pump parts, and in particular of the sealing parts, there are obviated all of the considerable construction difficulties involved in producing gear pumps, and in particular it is very easy to fit to the lateral sealing elements packings which, being located on the edges of very simple geometrical shapes, ensure a perfect seal even at very high pressures.

Another advantage of the pump described above lies in the fact that the fluid delivery does not depend properly upon the height of the gear crown, but upon the height of the cavity resulting from the meeting of the two individual gear cavities. Therefore, if the gear planes are not aligned, the pump delivery will vary, but no operating difficulty will be caused, as it would in a pump of conventional design if in machining a perfect parallelism where not achieved between the internal planes of the teeth of the gear pair.

One further advantage of the pump according to the invention in that it presents a body which, because of the particular shape of the gear cavities and of the sealing elements, is not weakened by bores extending over its entire length, which would affect the strength of the areas sujected to critical stresses caused by the internal operating pressure.

Any changes introduced in the design of the pump as described above, which, applying the same inventive concept, tend to achieve the same or a similar result, shall fall within the scope of protection of the invention.

What I claim is:

In a pump, a pump housing having parallel end surfaces and two parallel spaced apart bore holes extending through the housing from one end surface to the other, said bore holes being cylindrically enlarged at opposite ends inwardly a distance from said end surfaces, the enlarged portions of said bore holes overlapping each other to form a cavity interconnecting the bore holes, a drive shaft rotatably supported in one of said bore holes, another shaft rotatably supported in the other bore hole, a gear rigidly mounted on each of said shafts, said gears meshing one with the other and being disposed in the overlapping portions of said bore hole enlargements with the faces of said gears in substantially planar alignment, a bushing enclosing each of said shafts and extending axially in the enlarged portions of each of said bore holes and beyond the end surfaces of said housing, said bushings engaging the surfaces of said enlarged bore portions and said gears on opposite sides, and cover plates sealing the end surfaces of said housing, each of said cover plates having recesses to receive the extending portions of said bushings, one of said cover plates having an opening for said drive shaft to pass through.

References Cited in the file of this patent

UNITED STATES PATENTS

| | | |
|---|---|---|
| 1,285,819 | Smith | Nov. 26, 1918 |
| 2,052,419 | Moore et al. | Aug. 25, 1936 |
| 2,236,980 | Ungar | Apr. 1, 1941 |
| 2,293,126 | Fersing | Aug. 18, 1942 |
| 2,412,588 | Lauck | Dec. 17, 1946 |
| 2,420,622 | Roth et al. | May 13, 1947 |
| 2,620,553 | Schultz | Dec. 9, 1952 |
| 2,714,856 | Kane | Aug. 9, 1955 |
| 2,887,064 | Say | May 19, 1959 |
| 2,887,065 | Johnson | May 19, 1959 |

FOREIGN PATENTS

| | | |
|---|---|---|
| 936,479 | France | Feb. 16, 1948 |
| 1,125,350 | France | July 9, 1956 |